Nov. 28, 1933.    A. O. AUSTIN    1,937,184
JIGGER
Filed Sept. 22, 1930    4 Sheets-Sheet 1

INVENTOR
Arthur O. Austin,
BY Alpheus J. Crane
ATTORNEY

Nov. 28, 1933.  A. O. AUSTIN  1,937,184
JIGGER
Filed Sept. 22, 1930  4 Sheets-Sheet 2

INVENTOR
Arthur O. Austin
BY Alpheus J. Crane
ATTORNEY

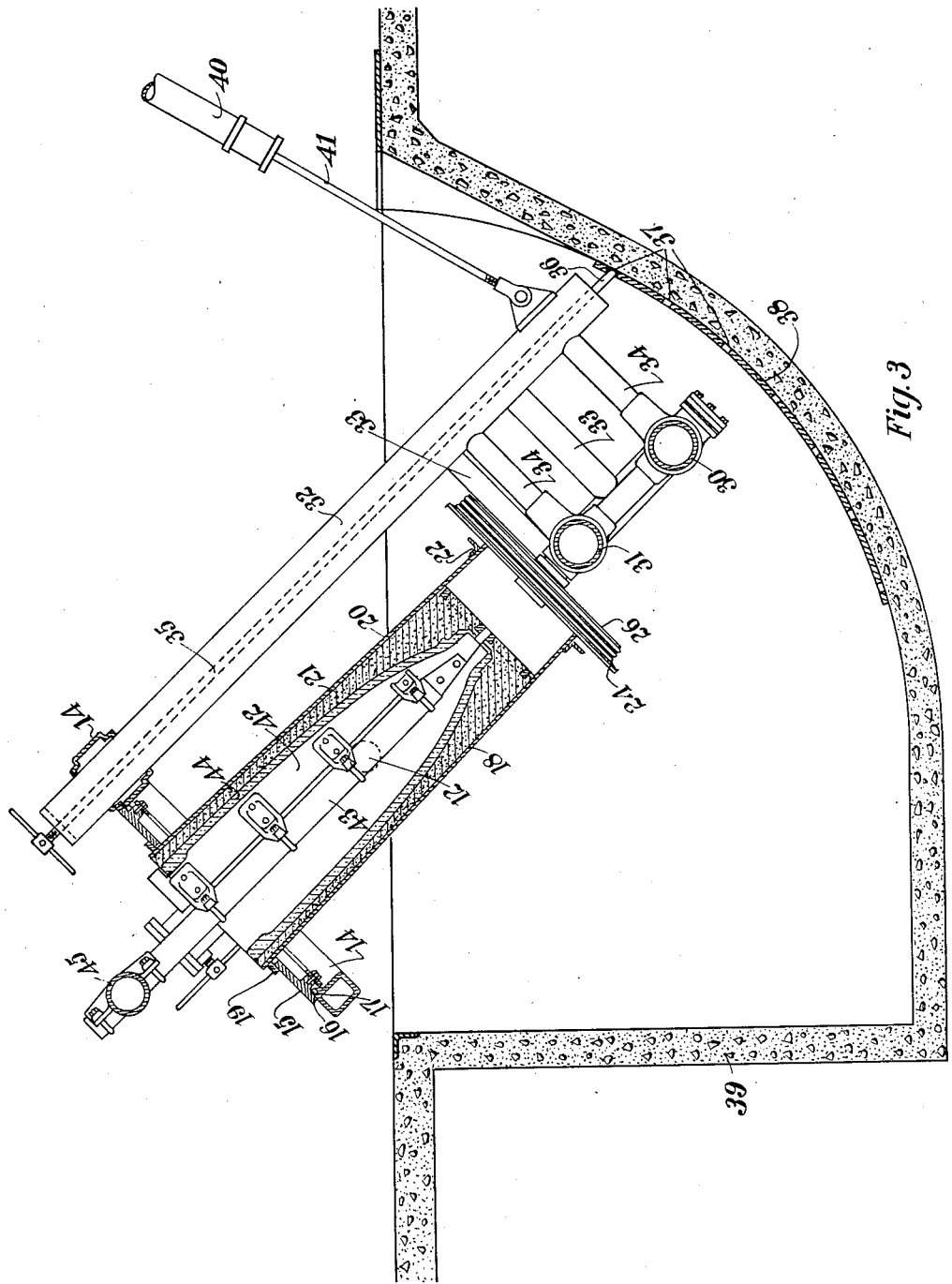

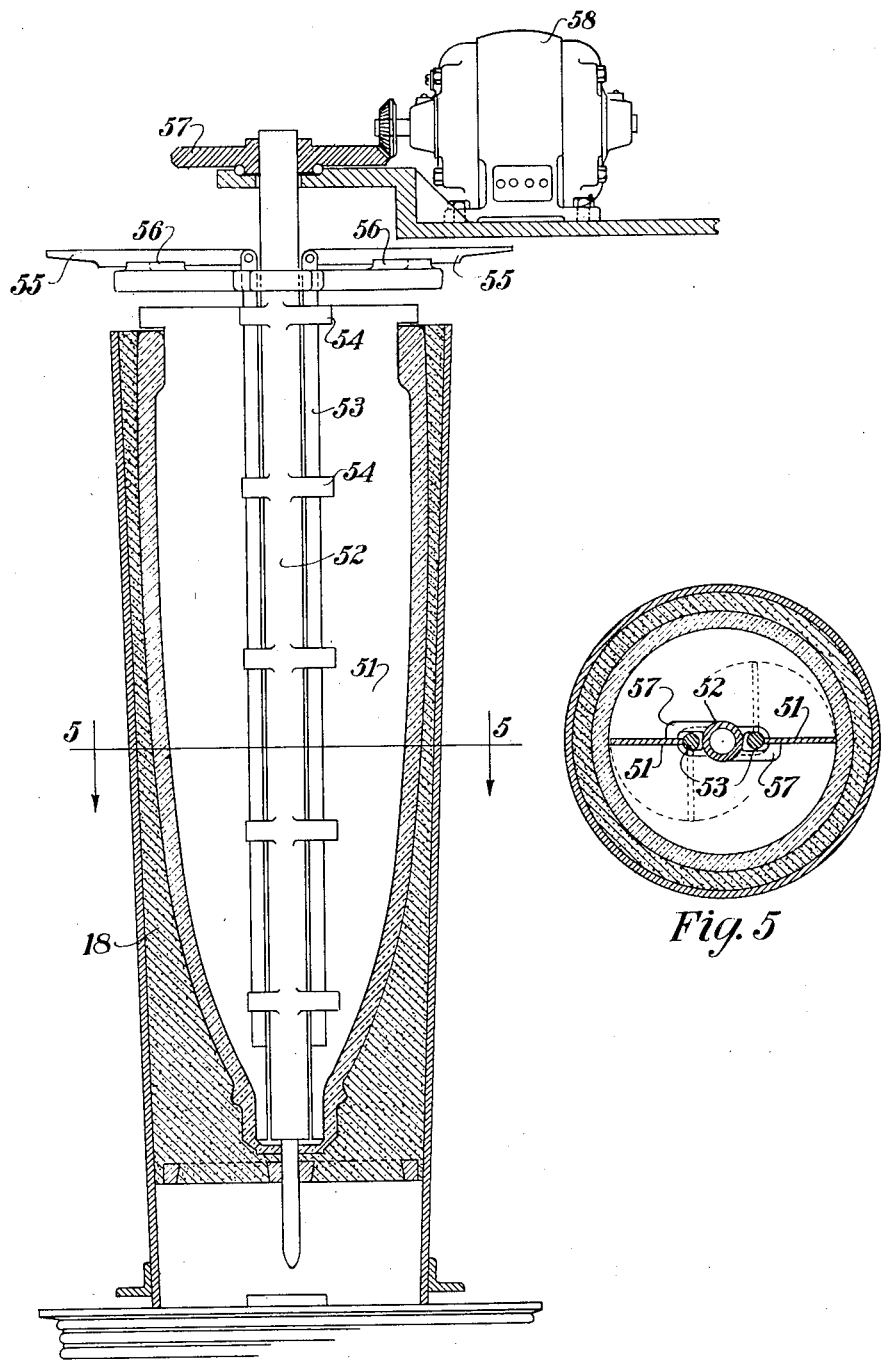

Patented Nov. 28, 1933

1,937,184

UNITED STATES PATENT OFFICE 1,937,184

JIGGER

Arthur O. Austin, near Barberton, Ohio, assignor, by mesne assignments, to The Ohio Brass Company, Mansfield, Ohio, a corporation of New Jersey Application September 22, 1930
Serial No. 483,429

15 Claims. (Cl. 25—24)

This invention relates to mechanism for forming articles from plastic material such as clay, and has for one of its objects the provision of a clay-forming machine or jigger in which the effect of gravity on the clay during the forming operation is largely avoided.

A further object is to provide a device of the class named by means of which articles of a large size, and especially cylindrical and conical articles, may be more readily formed than has heretofore been possible.

A further object is to provide a device of the class named which shall be of improved construction and operation.

Other objects and advantages will appear from the following description.

The invention is exemplified in the combination and arrangement of parts shown in the accompanying drawings and described in the following specification, and it is more particularly pointed out in the appended claims.

In the drawings:

Fig. 3 is a central, vertical section of the device shown in Fig. 1 but illustrating the device in its tilted position, and on a somewhat smaller scale than Fig. 1.

Fig. 4 is a vertical section of a mold showing a modification of the invention.

Fig. 5 is a section on line 5—5 of Fig. 4.

Figure 1:
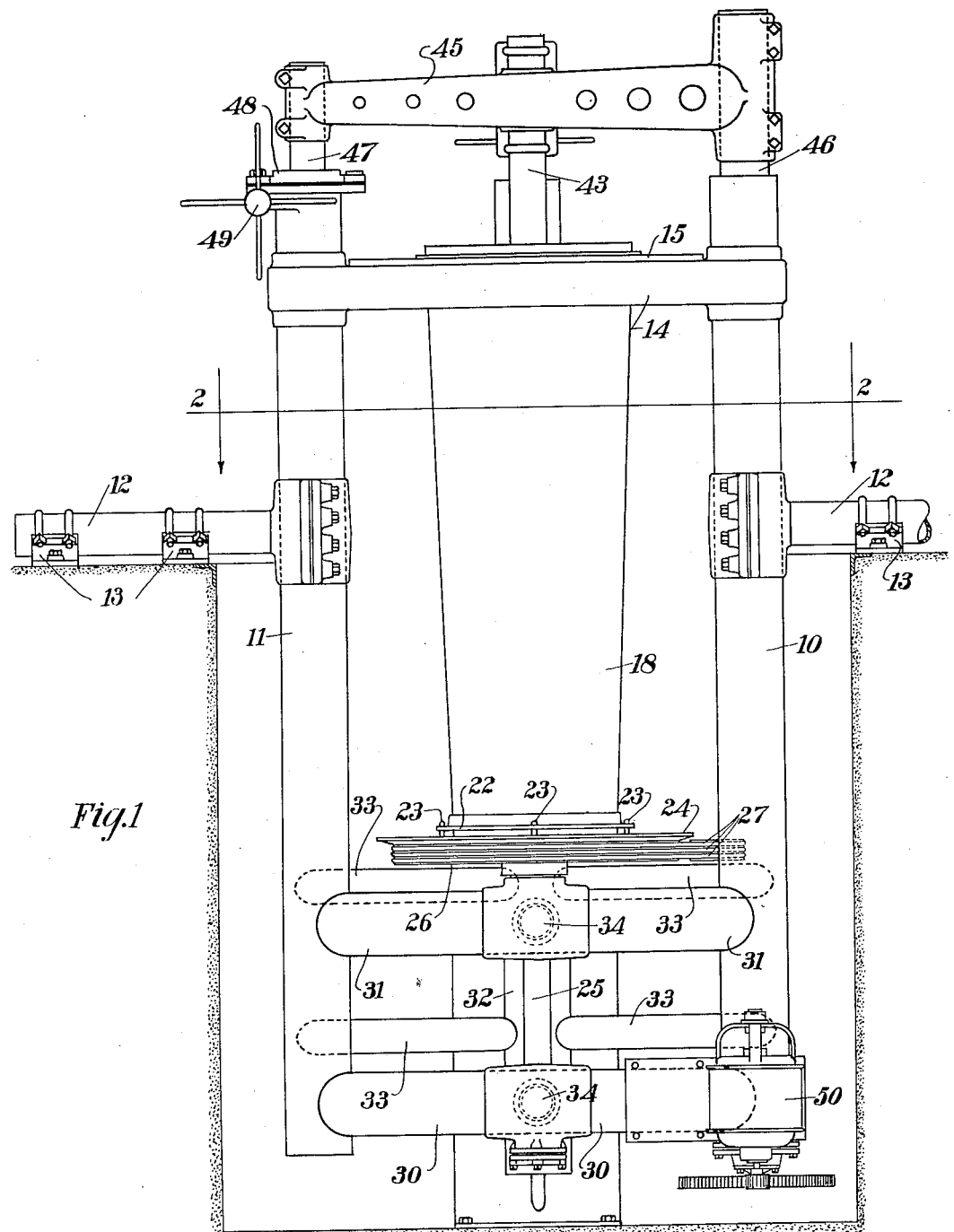
Fig. 1 is a vertical elevation of a jigger for forming insulator bushing parts and embodying one form of the present invention.
Figure 2:
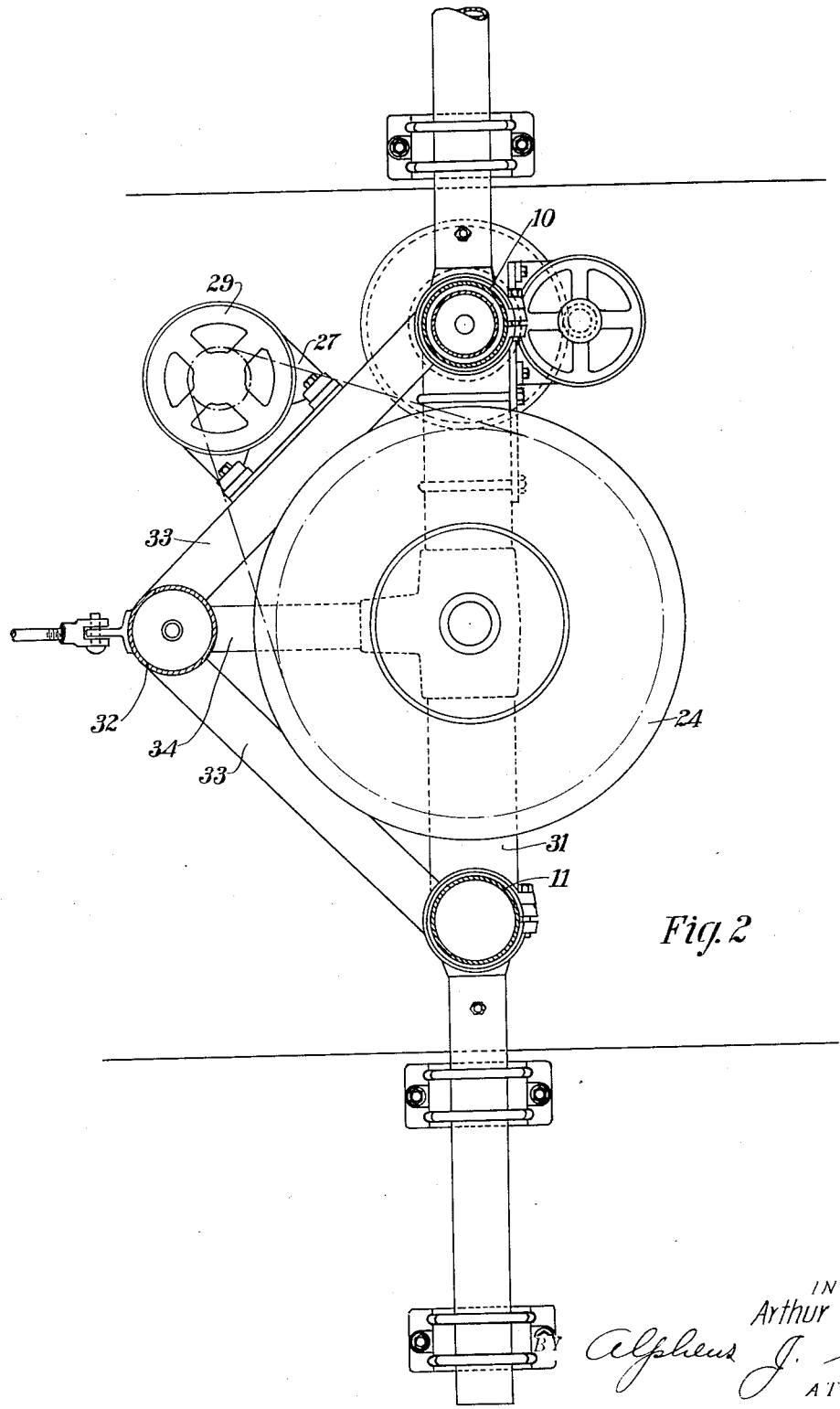
Fig. 2 is a horizontal section on line 2—2 of Fig. 1.

In forming cylindrical or conical pieces of ceramic ware by the process in which the clay is formed by a tool or sweep rotated in a mold, it is sometimes very difficult to cause the clay to rise from the bottom of the mold by the pressure of the tool where large pieces are being formed. If too long a time is required in the forming of the piece, the outer layer becomes encrusted, due to the absorption of the water by the mold and the inner surface becomes too soft, so that it is not only difficult to form the piece but it is also difficult to dry the piece without cracking. In order to reduce the resistance of gravity to the building up of the clay by the pressure of the tool, the present improved type of jigger has been invented.

In this invention, the mold is inclined at an angle to the vertical so that the clay sets up longitudinally of the mold very easily. Pieces of ware which are relatively deep can then be readily formed as the effect of gravity tending to hold the clay toward the lower end of the mold is greatly reduced. By rotating the mold at such a speed that centrifugal force will be sufficient to hold the clay against the mold on the upper side, it is possible to eliminate the effect of gravity entirely in the longitudinal direction of the mold. The forming tool may be placed in any convenient location either above or below at one side of the axis of the mold, so as to take advantage of a light pressure between the clay and the mold in setting up a longitudinal flow or distribution. After the material is formed, the mold may be tilted back into a vertical position. This may be done before the rotation is stopped so that there will be no tendency for the soft clay to collapse.

As illustrated in the drawings, the embodiment of the invention shown comprises a pair of tubular supports 10 and 11 mounted on trunnions 12 which are journaled in bearings 13. The supports 10 and 11 carry a platform 14 upon which a turn-table 15 is rotatably mounted. The turn-table 15 is preferably carried by roller bearings 16, traveling in a ball race 17. A mold 18 is provided with a flange at its upper end by which the mold may be removably but rigidly fixed to the turn-table 15, with the axis of the mold coinciding with the axis of rotation of the table 15. The mold 18 usually comprises an outer metal shell 20 and the plaster Paris lining 21; the inner surface of the lining 21 having the form and contour for the plastic article to be formed.

In the illustration shown the interior of the mold is shaped to form the outer contour of one portion of a large electrical bushing insulator. The weight of the mold is supported on the turn-table 15 but the lower end of the mold is provided with a flange 22 having perforations therein for receiving pins 23 projecting upwardly from a lower table 24, by means of which the mold is rotated. The table 24 is supported on a vertical spindle 25 and is provided with a groove pulley 26 which receives a plurality of driving belts 27 driven by a motor 29. The spindle 25 is supported by a pair of cross bars 30 and 31 connecting the lower ends of the tubular supports 10 and 11. A third tubular support 32 is connected to the supports 10 and 11 by braces 33 and 34. The motor 29 is mounted on braces 33. The support 32 at its upper end is fixed to the platform 14, and a rod 35 extends longitudinally through the support 32 and projects at its lower end, forming a locking bolt 36 for holding the jigger in various angular positions.

The bolt 36 is arranged to engage openings 37 in a lock plate 38 fixed to the bottom of a pit 39 in which the lower end of the jigger is suspended. A pneumatic cylinder 40 and connecting rod 41, and other suitable hoisting mechanism, may be employed for tilting the jigger upon its trunnions 12. A forming tool or sweep 42 is fixed to a spindle 43 which extends into the mold 18. The outer edge of the tool 42 is shaped to give the desired internal contour to the piece 44 which is being formed. The spindle 43 is mounted on an arm 45 which is carried by a plunger 46 telescoping with the support 10. A guide plunger 47 is carried by the end of the arm 45 and slidably engages a guide 48 on the upper end of the support 11. A guide 48 may be shifted by means of a hand wheel 49 to rotate the arm 45 about its supporting plunger 46, and thus move the tool 42 outwardly from the axis of the mold 18 as the formation of the piece 44 progresses. The plunger 46 is provided with a threaded jack screw driven by a motor 50, by means of which the plunger 46 and tool 42 may be raised and lowered. In operation the mold 18 is secured to the turn-table 15 and pins 23 and a suitable amount of clay is placed in the mold.

The mold is then tipped to the desired position, as indicated in Fig. 3, and the tool 42 fed downwardly and outwardly in the manner well-known to those skilled in the use of machines of this nature, so that the clay will be gradually worked upwardly in the mold and given the proper form. The fact that the mold is inclined to a horizontal makes it easier for the clay to be worked toward the top of the mold since the effect of gravity is much less upon the clay than would be the case if the mold were in a vertical position. It will be apparent from Fig. 3 that the clay at the upper side of the mold will have the tendency to collapse away from the wall of the mold, due to the action of gravity, but this tendency is counteracted by the centrifugal force of the clay due to the rotation of the mold. The speed of rotation and the inclination of the mold will be adjusted to each other and will be regulated according to the stiffness of the clay, so that the tendency to collapse will be overcome. In this way much deeper pieces can be formed by a jiggering operation than has heretofore been possible.

It has been found in practice that by the use of a machine of this kind, bushing insulator parts of extremely large size can be manufactured much more economically and quickly than has been heretofore possible and that a higher percentage of perfect pieces can be secured. Bushing insulators designed to withstand modern high voltages must be free from flaws of any kind, and a great deal of difficulty has heretofore been experienced in producing perfect pieces of large size. It has been found that this difficulty has been largely overcome by means of the present invention, as described above.

In the modification shown in Figs. 4 and 5, the mold 18 is carried by a supporting frame like that previously described but is provided with a pair of sweeps or forming tools 51 pivotally mounted on the spindle 52. The sweeps 51 are fixed to rods 53 journalled in bearings 54 on the spindle. The rods 53 carry adjustable members 55 at their upper ends which may be held in varying adjustable positions by toothed racks or keepers 56. Stops 57 limit the outward movement of the tools 51 to their radial positions, as shown in Fig. 5. The tools may be swung into their retracted positions shown in broken lines in Fig. 5 at the beginning of a forming operation and may be gradually moved outwardly as the work progresses. When the piece is finished, they may be again swung inwardly to facilitate removal from the interior of the mold. The upper end of the spindle 52 is provided with a gear 57 driven by a motor 58 so that the piece may be formed by rotation of the tool rather than by rotation of the mold. This gives a wider range of speeds than is produced where the mold alone is rotated. It will be understood that the mold may be held stationary or may be rotated in a direction opposite to that of the spindle or rotated in the same direction as the spindle but at a different speed. This will produce a differential movement between the mold and spindle so that the mold may be rotated to maintain the desired centrifugal force without producing excessive relative speed between the mold and forming tool.

I claim:

1. A jigger for ceramic products having its axis inclined at an oblique angle to the vertical.

2. A jigger for ceramic products comprising a mold, means for supporting the mold with its axis inclined at an oblique angle to the vertical, means for rotating the mold about its inclined axis, and a forming tool cooperating with said mold to form a plastic article.

3. A jigger for plastic articles comprising a mold, a forming tool cooperating with said mold, means for rotating said mold, and means for adjusting the axis of rotation of said mold relative to the vertical.

4. The combination with a mold for plastic articles, of a pivotal support for said mold, means for shifting said mold upon its pivotal support, and means for holding said mold at different positions of adjustment relative to its pivotal support.

5. The combination with a mold for forming ceramic articles, of a forming tool extending into said mold, means for rotating said mold about a central axis, and means for supporting said mold with said axis inclined at an oblique angle to the vertical.

6. The combination with a mold, of a forming tool cooperating with said mold to form a plastic article, a pivoted support for said mold and tool, means for rotating said support, means for adjusting said support to shift the axis of rotation of said support relative to the vertical, and means for locking said support in various positions of adjustment.

7. The combination with a supporting frame journaled to swing about a horizontal axis, of a mold carried by said frame and mounted to rotate about a longitudinal axis, a forming tool extending into said mold, a motor for rotating said mold about its axis, a power jack for raising and lowering said tool in said mold, and means for holding said supporting frame in a position in which the axis of said mold is inclined to the vertical.

8. The method of forming plastic articles in a mold comprising the steps of subjecting the plastic material simultaneously to opposing forces to regulate the pressure of the material against the face of the mold, and subjecting the material to the action of the forming tool while subject to the action of said opposing forces.

9. The method of forming plastic articles comprising the steps of subjecting plastic material to centrifugal force and the force of gravity acting against each other so that one will counteract the effect of the other, and applying a forming tool to the plastic material while subject to the two forces.

10. A jigger for forming plastic material comprising a mold, a forming tool, means for supporting the mold with its axis at an oblique inclination to the vertical, and means for rotating the forming tool to form the plastic material in the mold.

11. A jigger for forming plastic material comprising a mold, a forming tool, and means for rotating both the mold and the forming tool at different speeds in the same direction to produce differential rotation between the mold and tool.

12. A jigger for forming plastic material comprising a mold, a forming tool, means for supporting the mold at an inclination to the vertical, means for rotating the mold to subject the plastic material of the mold to centrifugal action, and means for rotating the tool in the same direction as said mold but at a different speed to produce differential movement between the tool and the mold.

13. A jigger for forming plastic material comprising a mold, a spindle extending into the mold, and a sweep pivotally mounted on the spindle on a pivotal axis substantially parallel to the axis of the mold.

14. A jigger for forming plastic material comprising a mold, a spindle extending into the mold, a motor for rotating said spindle, means for raising and lowering said spindle and motor relative to the mold, and a pair of sweeps pivotally mounted on said spindle, and means for holding said sweeps in adjustable positions relative to said spindle.

15. A jigger for forming plastic material comprising a mold for forming the outside of the piece, a tool for forming the inside of the piece, and means for rotating said tool and mold in both the same and opposite directions.

ARTHUR O. AUSTIN.